(12) United States Patent
Ding et al.

(10) Patent No.: US 12,710,301 B2
(45) Date of Patent: Aug. 18, 2026

(54) INCREASING ULTRASONIC FLOW MEASUREMENT UPDATE RATE

(71) Applicant: TEXAS INSTRUMENTS INCORPORATED, Dallas, TX (US)

(72) Inventors: Lei Ding, Plano, TX (US); Thomas Tsai, Allen, TX (US); Christopher Lucci, Murrysville, PA (US); John Varela Munoz, Plano, TX (US); Ravi Abhishek Shankar, West Lafayette, IN (US); Srinath Ramaswamy, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 353 days.

(21) Appl. No.: 18/589,923

(22) Filed: Feb. 28, 2024

(65) Prior Publication Data

US 2025/0271288 A1 Aug. 28, 2025

(51) Int. Cl.
*G01F 1/667* (2022.01)

(52) U.S. Cl.
CPC .................................... *G01F 1/667* (2013.01)

(58) Field of Classification Search
CPC ....................................................... G01F 1/667
See application file for complete search history.

(56) References Cited

U.S. PATENT DOCUMENTS

2023/0066926 A1 * 3/2023 Loos ......................... G01F 1/86

FOREIGN PATENT DOCUMENTS

WO WO-2018098085 A1 * 5/2018 ........... G01S 5/0036

* cited by examiner

*Primary Examiner* — Thomas M Hammond, III
(74) *Attorney, Agent, or Firm* — Zhenhai Fu; Frank D. Cimino

(57) ABSTRACT

A method includes at a first time, transmitting a first set of ultrasonic pulses from a first location. The method also includes, at a second time, receiving the first set of ultrasonic pulses at a second location. The method also includes, at a third time, transmitting a second set of ultrasonic pulses from the second location. The method also includes, at a fourth time, receiving a first echo of multiple echoes of the first set of ultrasonic pulses at the second location, in which the third time is the same as the first time, or is between the second time and the fourth time. The method also includes, at a fifth time, receiving the second set of ultrasonic pulses at the first location; and providing a flow rate measurement between the first and second locations based on the first time, the second time, the third time, and the fifth time.

20 Claims, 8 Drawing Sheets

TO ULTRASONIC RECEIVER

FROM ULTRASONIC RECEIVER

402

DRIVER

CONTROLLER

110/306

404

SIGNAL PROCESSOR

TRANSMIT TIMING CONTROL MODULE

TIME-OF-FLIGHT DETERMINATION MODULE

FLOW RATE DETERMINATION MODULE

406

408

412

410

COMMUNICATION INTERFACE

TIME OF TRANSMISSION

ToF

L AND θ (POSITION INFORMATION)

OTHER PROGRAMMING DATA

FLOW RATE MEASUREMENT

INCREASING ULTRASONIC FLOW MEASUREMENT UPDATE RATE

BACKGROUND

Ultrasonic flow sensing based on measurements of ultrasonic pulses can be used in a variety of applications including industrial, medical, and residential applications. Some examples of ultrasonic flow sensing use two transducers to measure upstream and downstream time-of-flight (TOF) information of ultrasonic pulses transmitted and propagated through a flow in a tube, and then calculates flow rate based on the TOF information. Existing ultrasonic flow sensing solutions often have a low update rate, e.g., less than 50 Hz, due to multiple reflections/echoes following each ultrasonic pulse transmission in the tube. It takes time for the echoes to die down before the next transmission of ultrasonic pulses can be initiated and transmitted. However, ultrasonic flow sensing in a lot of applications, such as in continuous positive airway pressure (CPAP) machines or ventilator, often requires a much higher update rate, e.g., greater or equal to 2 KHz.

SUMMARY

In an example, an apparatus includes a first ultrasonic transmitter at a first location, a first ultrasonic receiver at the first location, a second ultrasonic transmitter at a second location, a second ultrasonic receiver at the second location, and one or more controllers in communication with the first ultrasonic transmitter, the first ultrasonic receiver, the second ultrasonic transmitter, and the second ultrasonic receiver. The one or more controllers are configured to, at a first time, transmit a first set of ultrasonic pulses using the first ultrasonic transmitter. The one or more controllers are further configured to, at a second time, receive the first set of ultrasonic pulses using the second ultrasonic receiver. The one or more controllers are further configured to, at a third time, transmit a second set of ultrasonic pulses using the second ultrasonic transmitter. The one or more controllers are further configured to, at a fourth time, receive a first echo of multiple echoes of the first set of ultrasonic pulses using the second ultrasonic receiver, in which the third time is the same as the first time, or is between the second time and the fourth time. The one or more controllers are further configured to, at a fifth time, receive the second set of ultrasonic pulses using the first ultrasonic receiver; and provide a flow rate measurement between the first and second locations based on the first time, the second time, the third time, and the fifth time.

In another example, an apparatus includes a first ultrasonic transmitter, a first ultrasonic receiver; and a controller coupled to the first ultrasonic transmitter and the first ultrasonic receiver, the controller having a controller input and a measurement output. The controller is configured to receive a first signal at the controller input, the first signal representing a first time of transmission of a first set of ultrasonic pulses by a second ultrasonic transmitter. The controller is further configured to, at a second time, receive the first set of ultrasonic pulses using the first ultrasonic receiver. The controller is configured to, based on the first time and the second time, determine an expected arrival time of a first echo of multiple echoes of the first set of ultrasonic pulses at the first ultrasonic receiver. The controller is further configured to determine a third time of transmission of a second set of ultrasonic pulses, in which the third time precedes the expected arrival time, and at the third time, transmit a second set of ultrasonic pulses using the first ultrasonic transmitter. The controller is further configured to provide a second signal representing a flow rate measurement at the measurement output based on the first, second, and third times.

In another example, a method includes, at a first time, transmitting a first set of ultrasonic pulses from a first location. The method also includes, at a second time, receiving the first set of ultrasonic pulses at a second location. The method also includes, at a third time, transmitting a second set of ultrasonic pulses from the second location. The method also includes, at a fourth time, receiving a first echo of multiple echoes of the first set of ultrasonic pulses at the second location, in which the third time is the same as the first time, or is between the second time and the fourth time. The method also includes, at a fifth time, receiving the second set of ultrasonic pulses at the first location; and providing a flow rate measurement between the first and second locations based on the first time, the second time, the third time, and the fifth time.

In another example, a non-transitory computer readable medium stores instructions that, when executed by processor circuitry, cause the processor circuitry to control a first ultrasonic transmitter and a first ultrasonic receiver at a first location, a second ultrasonic transmitter and a second ultrasonic receiver at a second location to: at a first time, transmit a first set of ultrasonic pulses from a first location, at a second time, receive the first set of ultrasonic pulses at a second location, at a third time, transmit a second set of ultrasonic pulses from the second location, at a fourth time, receive a first echo of multiple echoes of the first set of ultrasonic pulses at the second location, in which the third time is the same as the first time, or is between the second time and the fourth time, at a fifth time, receive the second set of ultrasonic pulses at the first location; and provide a flow rate measurement between the first and second locations based on the first time, the second time, the third time, and the fifth time.

DETAILED DESCRIPTION

Figure 1:
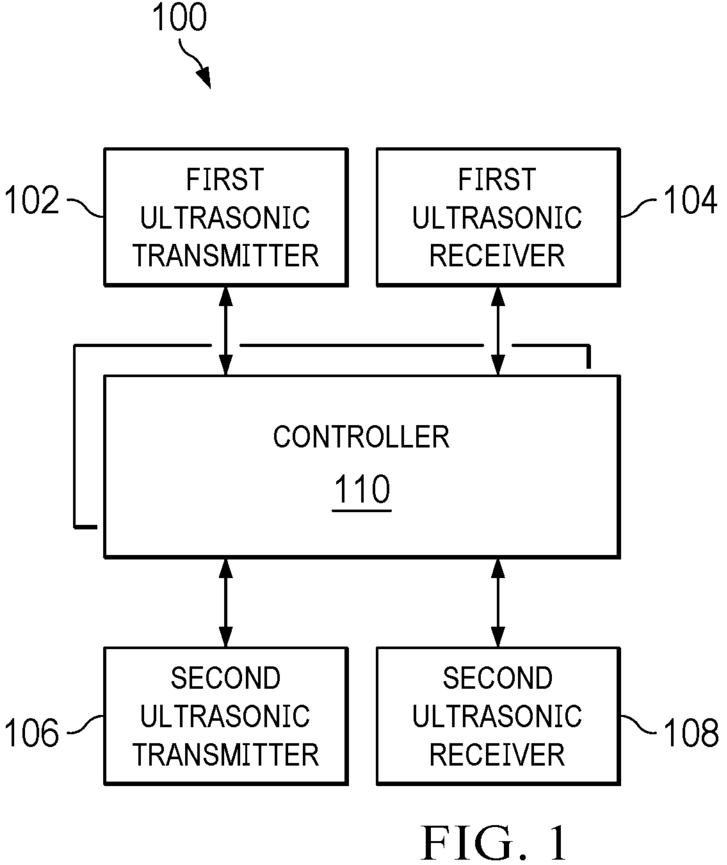
FIG. 1 is a schematic diagram of an ultrasonic flow measuring system, in an example.

The same reference numbers or other reference designators are used in the drawings to designate the same or similar (either by function and/or structure) features.

FIG. 1 is a schematic diagram of an example of an illustrative ultrasonic flow measuring system 100, which includes a first ultrasonic transmitter 102 and a first ultrasonic receiver 104, both at a first location. In one example, the first ultrasonic transmitter 102 and the first ultrasonic receiver 104 can be part of a single transducer, which can be controlled to transmit ultrasonic signals and to receive ultrasonic signals. In another example, the first ultrasonic transmitter 102 and the first ultrasonic receiver 104 can be separate transducers. The system 100 further includes a second ultrasonic transmitter 106 and a second ultrasonic receiver 108, both at a second location. The second ultrasonic transmitter 106 and the second ultrasonic receiver 108 can be part of a single transducer or can be separate transducers. In one example, each of the ultrasonic transmitters includes a driver having an output for transmitting a set of ultrasonic pulses and each of the ultrasonic receivers includes an amplifier having an input for detecting and receiving a set of ultrasonic pulses. In one example, a single transducer is configured to have both a transmitter output and a receiver input.

The system 100 further includes one or more controllers 110 in communication with the first ultrasonic transmitter 102, the first ultrasonic receiver 104, the second ultrasonic transmitter 106, and the second ultrasonic receiver 108. Such communication can be either wired communication via physical connections or wireless communication over one or more communication networks (not shown). For example, each of the communication networks can be an Internet, an intranet, a wide area network (WAN), a local area network (LAN), Bluetooth, Wi-Fi, and a mobile communication network. In one example, for TX, each ultrasound transmitter may be driven by a transceiver at configurable voltages to transmit signals to the controllers 110; for RX, signals from the controllers 110 may go through analog frontend circuitry of each ultrasound receiver for amplification and may then be digitalized with an analog-digital converter (ADC). In one example, the one or more controllers 110 include a single controller.

Figure 2:
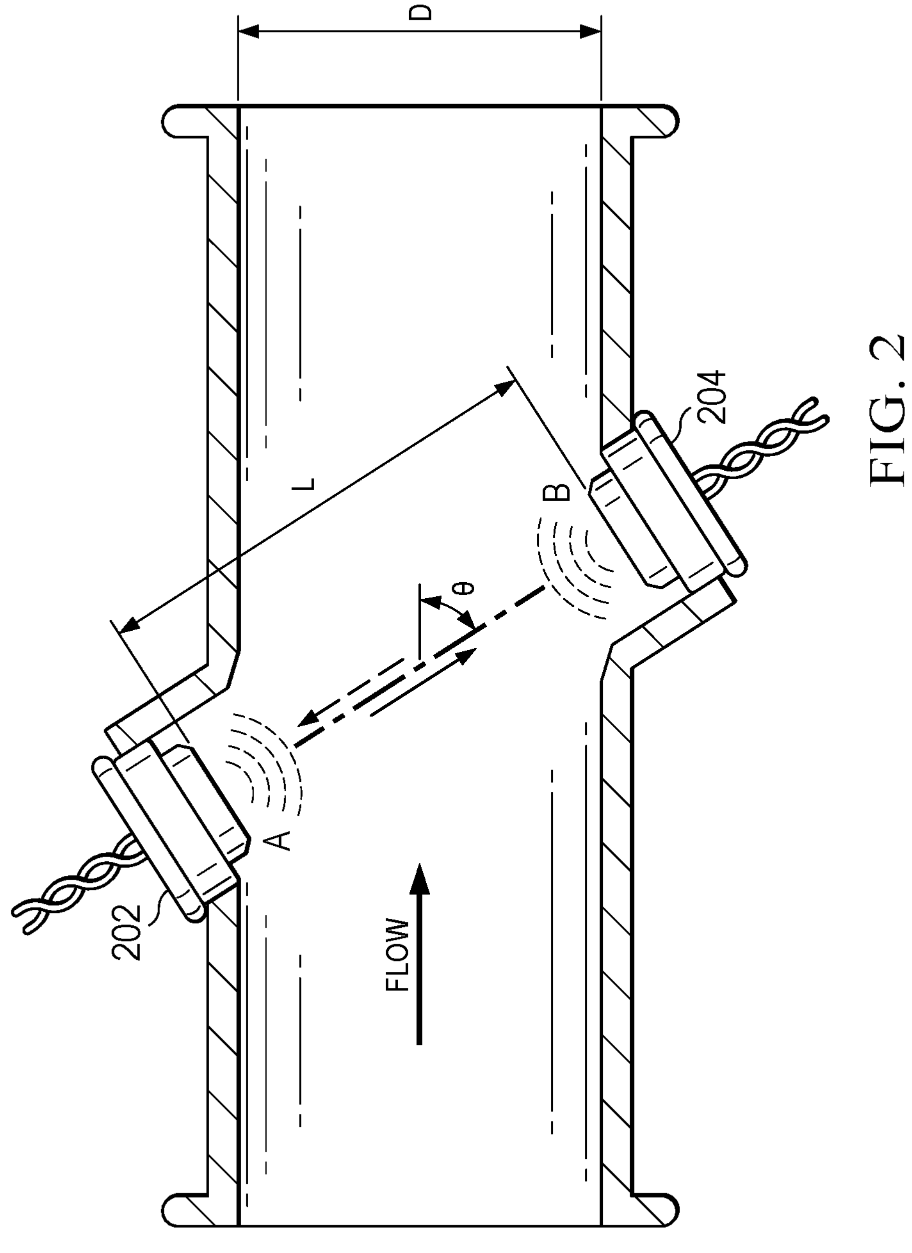
FIG. 2 is a schematic diagram of deployment of the ultrasonic flow measuring system of FIG. 1 for flow measurement, in an example.

FIG. 2 is a schematic diagram of an example of deployment of the ultrasonic flow measuring system of FIG. 1 for flow measurement through a tube. In the example of FIG. 2, the ultrasonic flow measuring system uses a pair of two transducers 202 and 204 to measure upstream and downstream TOF information of ultrasonic pulses through a flow in a tube and then calculates flow rate based on the TOF information. In one example, the first transducer 202 and the second transducer 204 are located at a first location A and a second location B of the tube, respectively. As shown in FIG. 2, the distance between the first location A and the second location B is denoted as L. The diameter of the tube is denoted as D. In one example, the angle of propagation between the direction of the flow and the direction of which ultrasonic pulses are being transmitted and received by the two transducers 202 and 204, is denoted as θ.

When the first transducer 202 at the first location A transmits (or fires) a set of ultrasonic pulses downstream through the flow towards the second transducer 204 at the second location B, the downstream TOF $T_{AB}$ can be calculated as:

$$T_{AB} = \frac{L}{c + v\cos(\theta)}$$

wherein c is the speed of sound in the flow media and v is the speed of the flow through the tube (also referred to as the flow speed). Conversely, when the second transducer 204 at the second location B transmits (or fires) a set of ultrasonic pulses upstream through the flow towards the first transducer 202 at the first location A, the upstream TOF $T_{BA}$ can be calculated as:

$$T_{BA} = \frac{L}{c - v\cos(\theta)}$$

The flow speed v can be calculated based on $T_{AB}$ and $T_{BA}$ as:

$$v = \frac{L}{2\cos(\theta)}\left(\frac{T_{BA} - T_{AB}}{T_{BA}T_{AB}}\right)$$

Flow rate can then be calculated as v*A–product of the flow speed v and area A of the cross section of the tube.

In one example, $T_{AB}$ and $T_{BA}$ can be found through absolute TOF measurement, for example, by determining when envelope/amplitude of the ultrasonic pulses received at one of the transducers crosses a pre-set threshold. For differential TOF, $T_{AB}-T_{BA}$ can be found through cross correlating upstream echoes and downstream echoes of the ultrasonic pulses, wherein signal of the received echo from one transducer is passed to the other transducer for cross correlation. In one example, the received analog signal from one transducer is passed to the other transducer having signal processing capabilities, which then performs post processing on the analog signal using an analog-digital converter (ADC). In one example, the processing of the data, e.g., calculation of TOF $T_{AB}$, calculation of TOF $T_{BA}$, calculation of flow rate, etc., may be performed by the one or more controller 110.

Figures 3, 4:
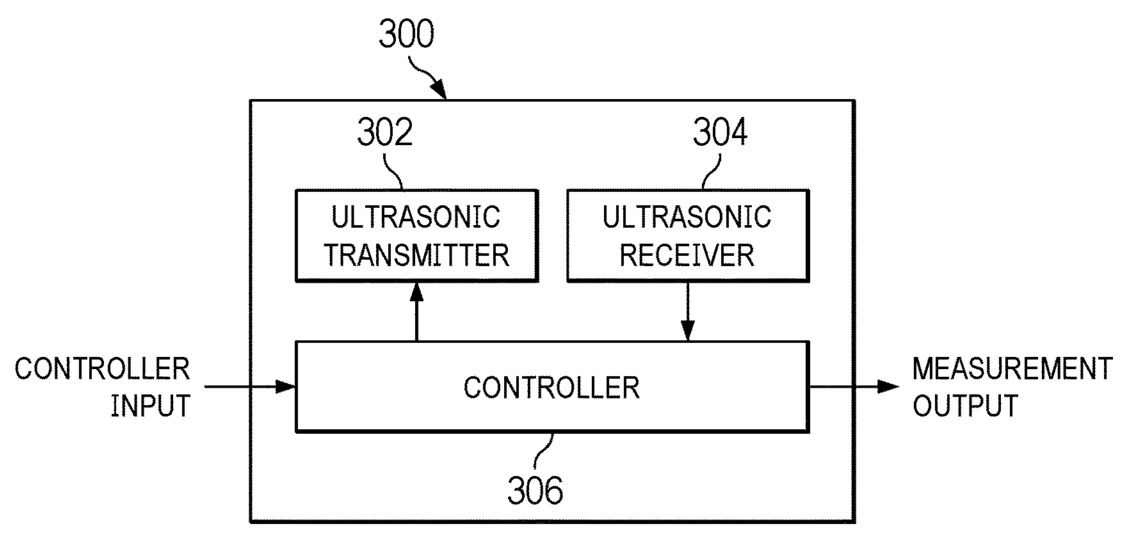
FIG. 3 is a schematic diagram of an integrated ultrasonic flow measuring unit, in an example.
FIG. 4 is a schematic diagram of the controller in FIGS. 1 and 3, in an example.

FIG. 3 is a schematic diagram of an example of an integrated ultrasonic flow measuring unit 300, which includes an ultrasonic transmitter 302, an ultrasonic transmitter 304, and a controller 306. In an example, the controller 306 is configured to accept as its input—controller input—from other units, calculate the flow rate based on the controller input received, and provide flow measurement result as measurement output to other units. In one example, the ultrasonic transmitter 302, the ultrasonic transmitter 304, and the controller 306 are all included in a single chip.

FIG. 4 is a schematic diagram of an example of the controller 110 in FIG. 1 or 306 in FIG. 3, wherein the controller includes one or more of driver 402, signal processor 404, transmit timing control module 406, time-of-flight determination module 408, flow rate determination module 410, and communication interface 412. As shown in the example of FIG. 4, controller 110 or 306 is configured to receive, as part of its controller input, one or more of time of transmission, TOF information, position information (e.g., L or θ), flow measurement, and other programming data from one or more other transducers through communication interface 412. Driver 402 is configured to interact with ultrasonic transmitter and ultrasonic receiver to cause the ultrasonic transducers to transmit and detect/receive sets of ultrasonic pulses/signals, respectively. In one example, driver 402 may also condition the signals via, e.g., signal biasing or pre-biasing. For signal processing, the signal processor 404 is configured to distinguish echoes from a direct path signal of the ultrasonic pulses, e.g., based on expected time of arrival of the signals. For example, the signal processor 404 receives and processes echoes of the first set of ultrasonic pulses that are transmitted by the first ultrasonic transmitter 102, bounced back from the second ultrasonic receiver 108, and received at the first ultrasonic receiver 104 to estimate the time of arrival of the signals. The signal processor 404 dismisses the echoes from other measurement cycles or sessions, e.g., based on frequency or band of frequencies, as discussed below, and determines a time of reception of a direct path signal from the other transducer(s). In one example, transmit timing control module 406 determines and controls timing of the transmission of the set of ultrasonic pulses via the ultrasonic transmitter 302. Time-of-flight determination module 408 determines TOF based on the transmit and receive time of the set of ultrasonic pulses and flow rate determination module 410 determines the flow rate based on the TOF information received from the time-of-flight determination module 408. In one example, controller 110 or 306 is configured to provide/transmit the flow rate measurement as part of the measurement output through the communication interface 412.

Figure 5A:
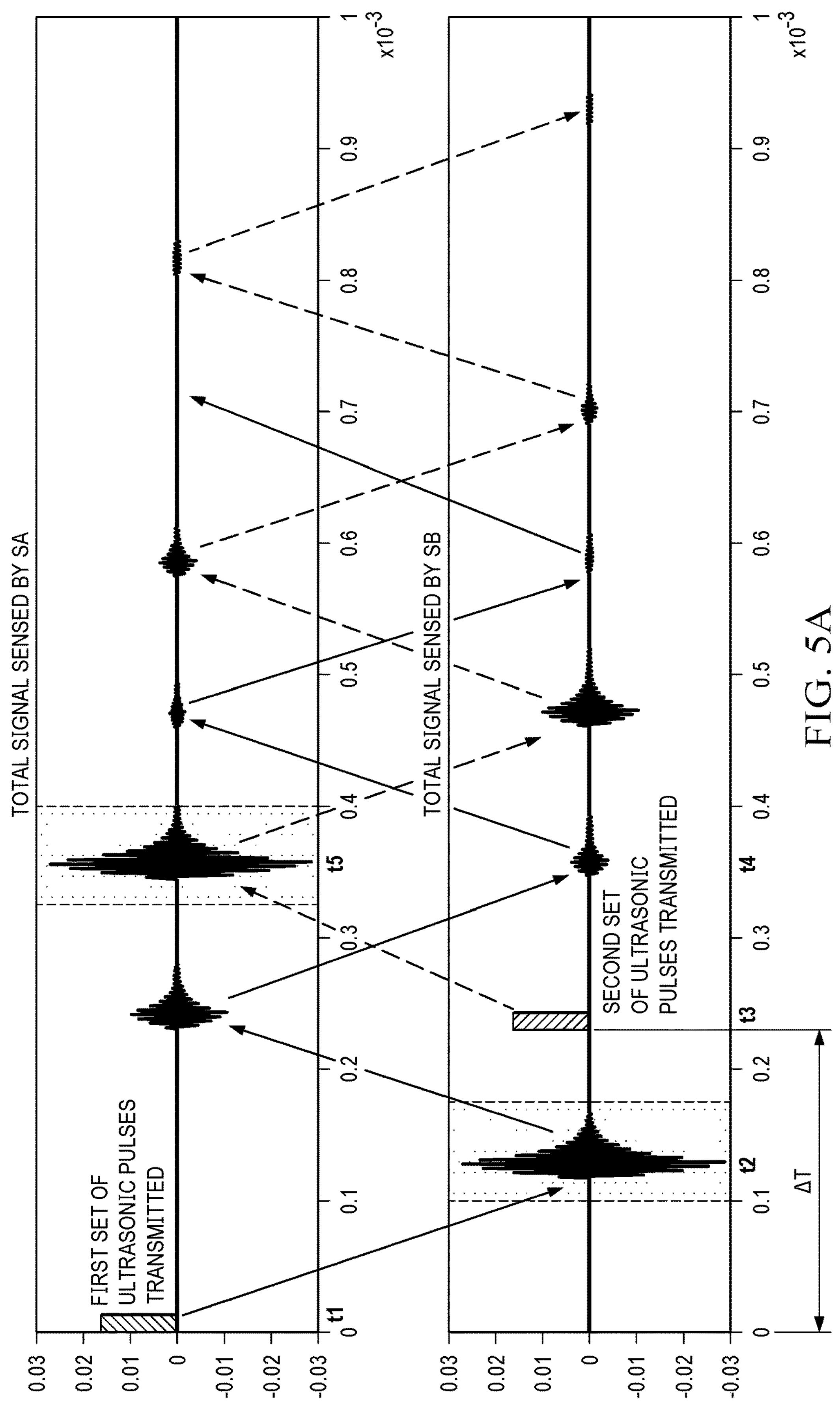
FIG. 5A is a graph illustrating timing sequences of two sets of ultrasonic pulses transmitted and received by the transmitters and receivers of FIGS. 1 and 3 during one flow measurement cycle, in an example.

FIG. 5A is a graph illustrating timing sequences of two sets of ultrasonic pulses transmitted and received by the transmitters and receivers of FIGS. 1 and 3 during one flow measurement cycle (the discussions below based on FIG. 1 is also applicable to FIG. 3). At a first time t1, the one or more controllers 110 are configured to transmit a first set of ultrasonic pulses using the first ultrasonic transmitter 102. The first set of ultrasonic pulses is received by the controllers 110 using the second ultrasonic receiver 108 at a second time t2. The one or more controllers 110 are further configured to transmit a second set of ultrasonic pulses using the second ultrasonic transmitter 106 at a third time t3, which is a time interval ΔT after the first set of ultrasonic pulses is transmitted at the first time t1. For example, the second set of ultrasonic pulses can be transmitted around ΔT of 230 us from the start of transmitting of the set of ultrasonic pulses at the first time t1.

Note that there may be multiple reflections of the first set of ultrasonic pulses bouncing/echoing back and forth between the first ultrasonic receiver 104 at location A and the second ultrasonic receiver 108 at location B and it takes time for the echoes to die down, e.g., amplitude of the echoes received at one of the transducers to be attenuated below a pre-set noise threshold. For example, a first echo of multiple echoes of the first set of ultrasonic pulses is received by the one or more controllers 110 using the second ultrasonic receiver 108 at location B at a fourth time t4. As shown by the example of FIG. 5A, the second set of ultrasonic pulses is transmitted by the one or more controllers 110 at the third time t3, which is between the second time t2 and the fourth time t4. In other words, instead of waiting for all echoes of the first set of ultrasonic pulses to die down before firing new set of ultrasonic pulses, the one or more controllers 110 are configured to transmit the second set of ultrasonic pulses using the second ultrasonic transmitter 106 before the first echo of the first set of ultrasonic pulses is received using the second ultrasonic receiver 108 at fourth time t4. The second set of ultrasonic pulses is then received by the one or more controllers 110 at a fifth time t5 using the first ultrasonic receiver 104.

In one example, the one or more controllers 110 are configured to transmit the second set of ultrasonic pulses at the third time t3 (AT from the first time t1) after the first set of ultrasonic pulses finishes a round trip and bounces back to location A. Delaying the transmission of the second set of ultrasonic pulses by a round-trip time ensures that the echoes of the first set of ultrasonic pulses have become a lot smaller and thus will not interfere with the second set of ultrasonic pulses.

In one example, the first set of ultrasonic pulses is transmitted downstream of a flow from location A towards location B and the second set of ultrasonic pulses is transmitted upstream from location B towards A during one flow measuring cycle. The one or more controllers 110 are configured to determine both the downstream TOF $T_{AB}$ and the upstream TOF $T_{BA}$ based on one or more of the first time t1, the second time t2, the third time t3, and the fifth time t5. The one or more controllers 110 then provide a flow rate measurement based on the downstream TOF $T_{AB}$ and the upstream TOF $T_{BA}$ as discussed above.

In one example, the one or more controllers 110 receive the first time t1 of transmission of the first set of ultrasonic pulses as part of its controller input and determine TOF of the first set of ultrasonic pulses based on t1 and the second time t2 when the first set of ultrasonic pulses is received by the second ultrasonic receiver 108. In one example, the one or more controllers 110 further use the TOF as well as other programming data received as part of controller input to estimate the fourth time t4—the expected time the first echo of the first set of ultrasonic pulses is to be received by the second ultrasonic receiver 108. The one or more controllers 110 then transmit the second set of ultrasonic pulses at the third time t3 before the expected time t4.

By time-interleaving initiation and transmission of ultrasonic pulses instead of waiting for echoes from the prior ultrasonic pulses to die down, the update rate of ultrasonic flow measurement can be increased while reducing interferences between echoes of upstream/downstream ultrasonic pulses. Such an approach is especially suited for flow sensing in applications with high update rate, e.g., greater or equal to 2 KHz, such as in CPAP machines and ventilators.

Figure 5B:
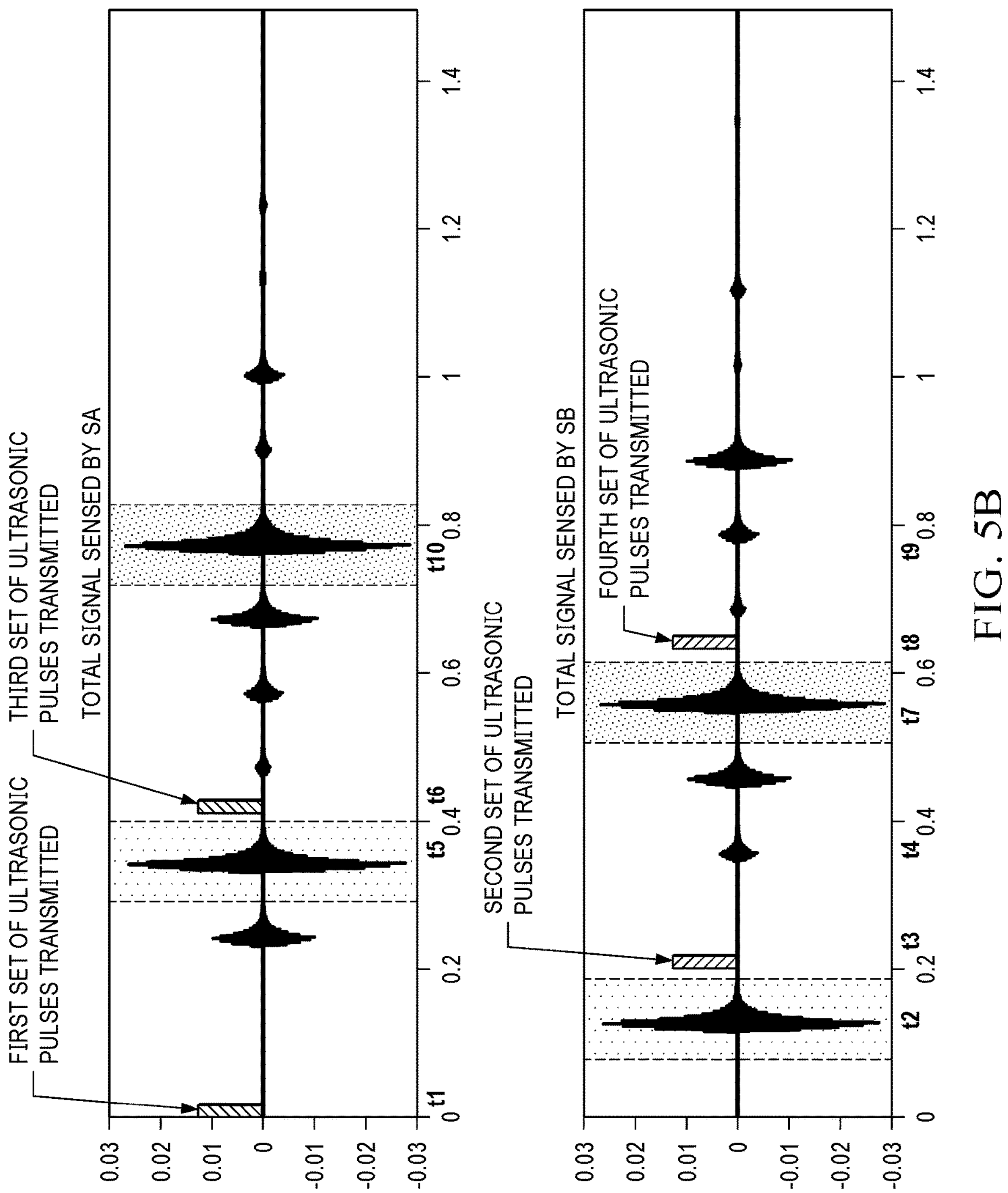
FIG. 5B is a graph illustrating timing sequences of additional sets of ultrasonic pulses transmitted and received by the transmitters and receivers of FIGS. 1 and 3 during multiple flow measurement cycles, in an example.

In one example, the one or more controllers 110 are configured to initiate another flow measurement cycle by transmitting/firing additional sets of ultrasonic pulses before the echoes from the first and second sets of ultrasonic pulses die down. FIG. 5B is a graph illustrating timing sequences of additional sets of ultrasonic pulses transmitted and received by the transmitters and receivers of FIGS. 1 and 3 during multiple flow measurement cycles. At a sixth time t6, the one or more controllers 110 are configured to transmit a third set of ultrasonic pulses using the first ultrasonic transmitter 102. The third set of ultrasonic pulses is received by the controllers 110 using the second ultrasonic receiver 108 at a seventh time t7. The one or more controllers 110 are further configured to transmit a fourth set of ultrasonic pulses using the second ultrasonic transmitter 106 at an eighth time t8. As shown by the example of FIG. 5B, the eighth time t8 is between the seventh time t7 and the ninth time t9, when a first echo of multiple echoes of the third set of ultrasonic pulses is received by the one or more controllers 110 using the second ultrasonic receiver 108 at a ninth time t9. In other words, instead of waiting for all echoes of the third set of ultrasonic pulses to die down before firing new set of ultrasonic pulses, the one or more controllers 110 are configured to transmit the fourth set of ultrasonic pulses using the second ultrasonic transmitter 106 before the first echo of the third set of ultrasonic pulses is received using the second ultrasonic receiver 108 at ninth time t9. The fourth set of ultrasonic pulses is then received by the one or more controllers 110 at a tenth time t10 using the first ultrasonic receiver 104.

In one example, the third set of ultrasonic pulses is transmitted downstream of the flow from location A towards location B similar to the first set of ultrasonic pulses and the fourth set of ultrasonic pulses is transmitted upstream from location B towards A similar to the second set of ultrasonic pulses during the current flow measuring cycle. The one or more controllers 110 are configured to determine both the downstream TOF $T_{AB}$ and the upstream TOF $T_{BA}$ based on one or more of the sixth time t6, the seventh time t7, the eighth time t8, and the tenth time t10, and to update the flow rate measurement based on the downstream TOF $T_{AB}$ and the upstream TOF $T_{BA}$ during the current flow measurement cycle as discussed above.

In some examples, the one or more controllers 110 can control the pair of two transducers 202 and 204 to transmit, respectively, the first set of ultrasonic pulses and the second set of ultrasonic pulses of FIG. 5A simultaneously, which can further reduce the update rate of ultrasonic flow measurement compared with the interleaving arrangement illustrated in FIG. 5A. Such arrangements can be supported by having two separate receive signal chains (e.g., separate analog front ends, separate ADCs, etc.) coupled to each of transducers 202 and 204. Interference between the transmitted and received ultrasonic pulses can be reduced by, for example, introducing a blanking period at each receive signal chain after transmission of a set of ultrasonic pulses, to avoid the receive signal chain of a transducer processing the locally transmitted ultrasonic pulses as signals received from the other transducer.

The one or more controllers 110 are configured to reduce interference between the multiple sets of ultrasonic pulses transmitted by the same ultrasonic transmitter in the same direction through signal modulation. In one example, the one or more controllers 110 are configured to set and transmit the first set of ultrasound pulses and the second set of ultrasound pulses at a first pulse frequency, while setting and transmitting the third set of ultrasound pulses and the fourth set of ultrasound pulses at a second pulse frequency via the first and second ultrasonic transmitters. In one example, the first pulse frequency and the second pulse frequency are different, e.g., the first pulse frequency is 290 kHz while the second pulse frequency is at a different frequency 310 kHz. Note that both the first and the second pulse frequencies are within the bandwidth of the first and second ultrasonic transmitters.

Figure 6:
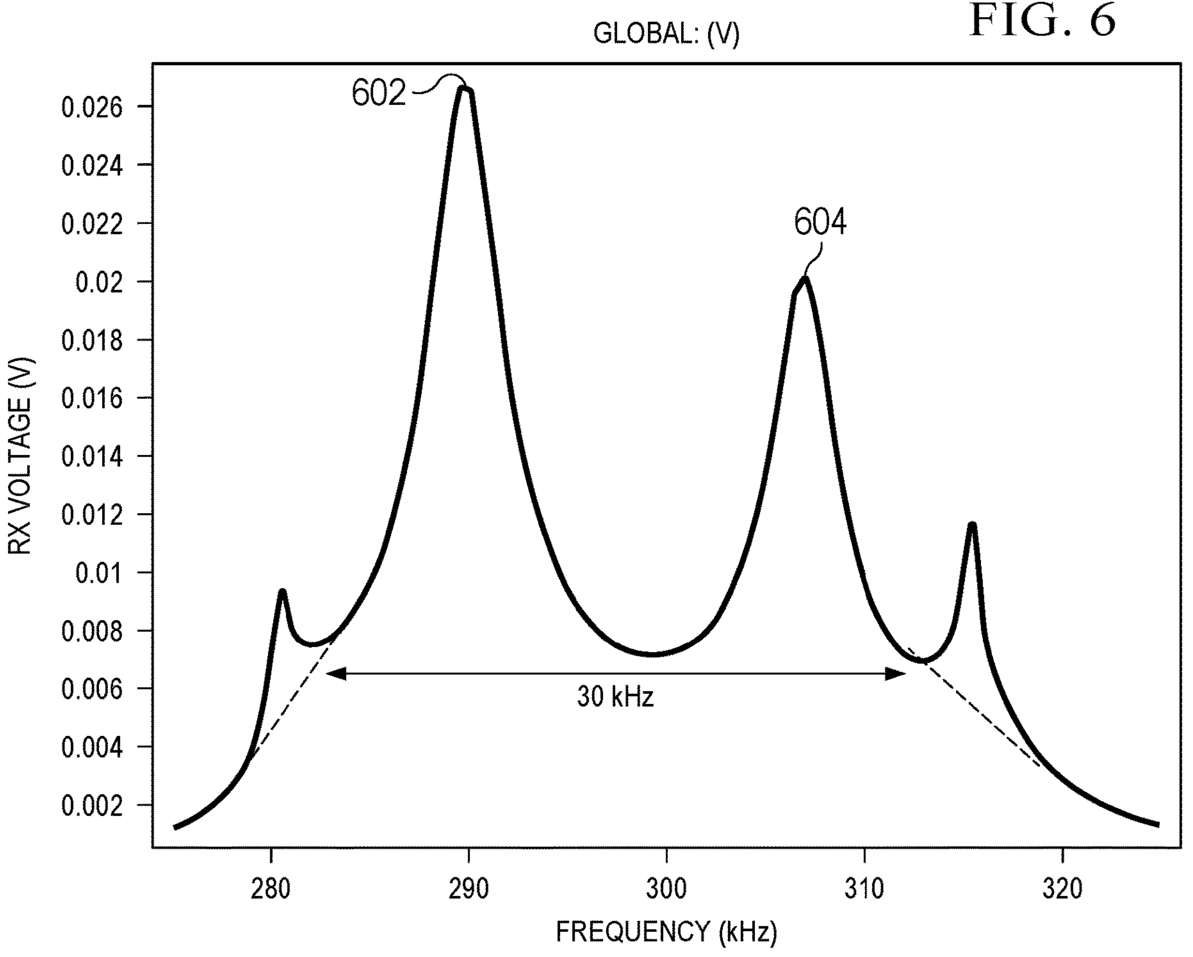
FIG. 6 is a graph illustrating an example of multiple resonance peaks in frequency responses of ultrasonic transmitters and receivers of FIGS. 1 and 3, in an example.

Each of the ultrasonic transducers (transmitters and receivers) may have multiple resonance peaks. The one or more controllers 110 are configured to select the first and the second pulse frequencies based on the ultrasonic transducer's characteristic to obtain better performance and accuracy. Specifically, the one or more controllers 110 are configured to select the first pulse frequency and the second pulse frequency based on frequency responses of one or more of the ultrasonic transducers, e.g., the first ultrasonic transmitter, the first ultrasonic receiver, the second ultrasonic transmitter, and the second ultrasonic receiver. FIG. 6 is a graph illustrating an example of multiple resonance peaks in frequency responses of the ultrasonic transmitters and receivers of FIGS. 1 and 3. As shown by the example of FIG. 6, the one or more controllers 110 may sweep a frequency range from 285 kHz to 300 kHz and automatically select 289 kHz (602) as the first pulse frequency because the received signal is strongest at 602. The one or more controllers may continue to sweep a range from 301 kHz to 310 kHz and select 306 kHz (604) as the second pulse frequency. Such frequency selection leads to a better signal to noise ratio, which translates to a better TOF measurement accuracy and flow measurement accuracy.

In one example, the one or more controllers 110 are configured to set and transmit the first set of ultrasound pulses and the second set of ultrasound pulses as upchirp pulse signals having a first pulse frequency range. The one or more controllers 110 are further configured to set and transmit the third set of ultrasound pulses and the fourth set of ultrasound pulses as downchirp pulse signals having a second pulse frequency range. In one example, the first pulse frequency range and the second pulse frequency range overlap, e.g., with the first and the second set of ultrasound pulses using upchirp from 290 kHz to 310 kHz and the third and the fourth set of ultrasonic pulses using downchirp from 310 kHz to 290 kHz. In one example, the first pulse frequency range and the second pulse frequency range do not overlap, e.g., with the first and the second set of ultrasound pulses using upchirp from 290 kHz to 300 kHz and the third and the fourth set of ultrasonic pulses using downchirp from 310 kHz to 300 kHz. The frequency separation coupled with signal modulation between the sets of ultrasonic pulses creates isolation of signals and residual echoes during calculation of cross-correlation between upstream/downstream signals.

Figure 7:
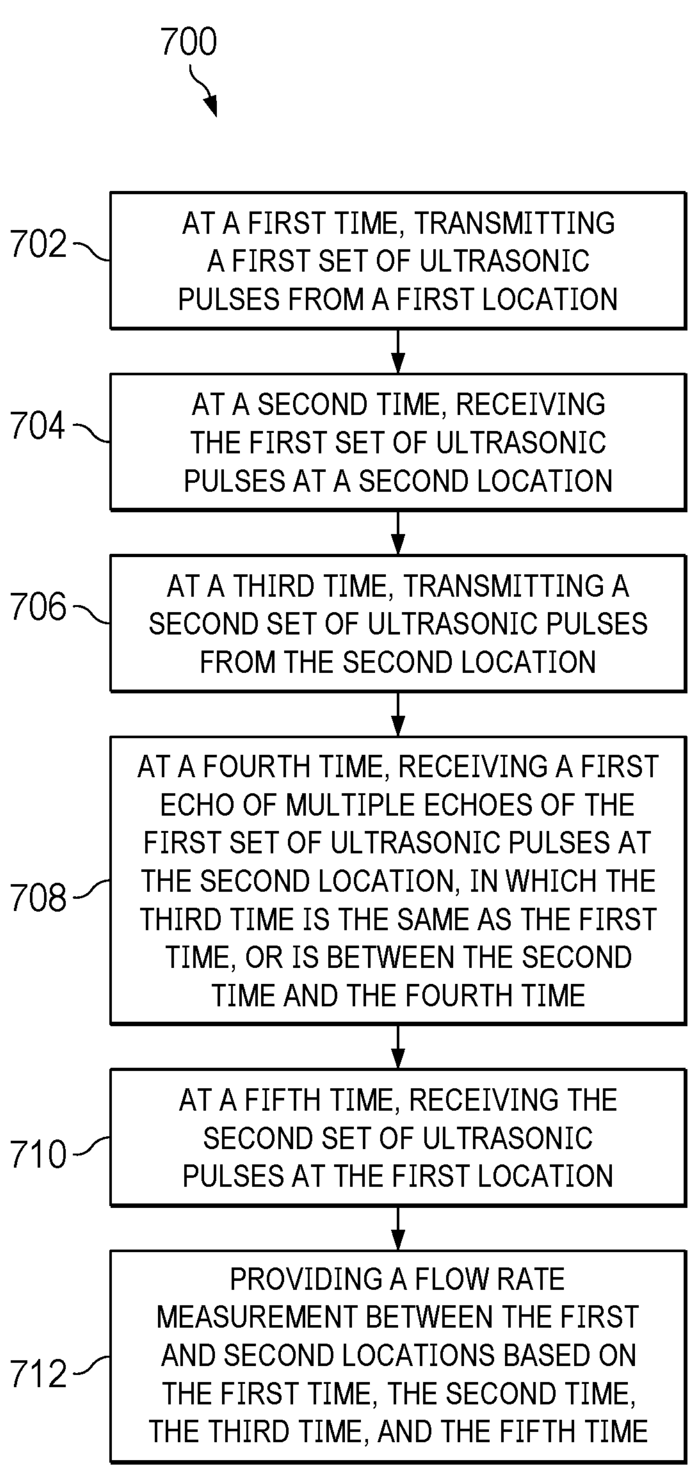
FIG. 7 is a flowchart of a method for ultrasonic flow measuring by the system of FIGS. 1 and 3, in an example.

FIG. 7 is a flowchart illustrating a method 700 for ultrasonic flow measurement. Method 700 can include example methods and operations described in, for example, FIG. 1. Method 700 can be performed by various components of system 100 including, for example, the first ultrasonic transmitter 102, the first ultrasonic receiver 104, the second ultrasonic transmitter 106, the second ultrasonic receiver 108, and the one or more controllers 110.

At block 702, the one or more controllers 110 are configured to, at a first time, transmit a first set of ultrasonic pulses using the first ultrasonic transmitter 102 from the first location.

At block 704, the one or more controllers 110 are configured to, at a second time, receive the first set of ultrasonic pulses transmitted by the first ultrasonic transmitter 102 using the second ultrasonic receiver 108 at the second location.

At block 706, the one or more controllers 110 are configured to, at a third time, transmit a second set of ultrasonic pulses using the second ultrasonic transmitter 106 at the second location.

At block 708, the one or more controllers 110 are configured to, at a fourth time, receive a first echo of multiple echoes of the first set of ultrasonic pulses using the second ultrasonic receiver 108 at the second location, in which the third time is the same as the first time, or is between the second time and the fourth time.

At block 710, the one or more controllers 110 are configured to, at a fifth time, receive the second set of ultrasonic pulses transmitted by the second ultrasonic transmitter 106 using the first ultrasonic receiver 104 at the first location.

At block 712, the one or more controllers 110 are configured to provide a flow rate measurement between the first and second locations based on the first time, the second time, the third time, and the fifth time.

Figure 8:
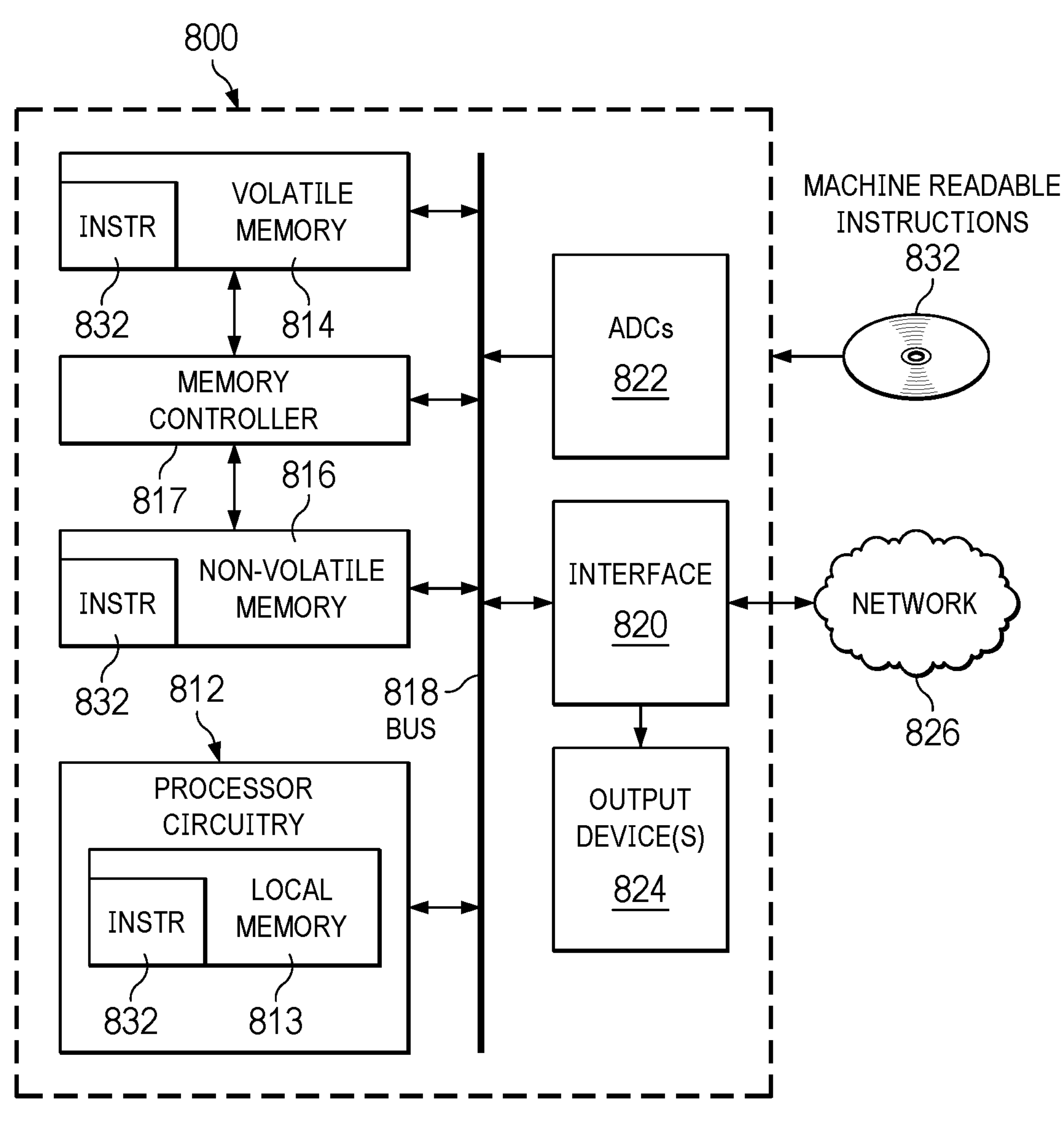
FIG. 8 is a schematic of an example processor that can implement part of the system of FIGS. 1 and 3, in an example.

FIG. 8 is a block diagram of an example processor platform 800 including processor circuitry structured to execute machine-readable instructions to implement the logic depicted in the examples of FIGS. 1 and 3. Processor platform 800 of the illustrated example can include processor circuitry 812. The processor circuitry 812 of the illustrated example includes hardware. For example, processor circuitry 812 can be implemented by one or more integrated circuits, logic circuits, FPGAs, microprocessors, Central Processing Units (CPUs), Graphical Processing Units (GPUs), Digital Signal Processors (DSPs), and/or microcontrollers from any desired family or manufacturer. Processor circuitry 812 can be implemented by one or more semiconductor-based (e.g., silicon-based) devices. In this example, processor circuitry 812 can implement the controllers 110 of FIG. 1 and controller 306 of FIG. 3.

Processor circuitry 812 of the illustrated example can include a local memory 813 (e.g., a cache, registers, etc.). Processor circuitry 812 of the illustrated example is in communication with a computer-readable storage device such as a main memory including a volatile memory 814 and a non-volatile memory 816 by a bus 818. The volatile memory 814 can be implemented by, for example, Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by programmable read-only memory, flash memory and/or any other desired type of non-volatile memory device. Access to the main memory 814, 816 of the illustrated example can be controlled by a memory controller 817.

The processor platform 800 of the illustrated example also includes interface circuitry 820. The interface circuitry 820 may be implemented by hardware in accordance with any type of interface standard, such as an Inter-Integrated Circuit (I2C) interface, a Serial Peripheral Interface (SPI), an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input ADCs 822 are connected to bus 818. The ADCs 822 can convert analog signals to digital signals for processing by the processor circuitry 812.

One or more output devices 824 can be connected to the interface circuitry 820 of the illustrated example. The output device(s) 824 can include circuits such as driver circuits for, e.g., the driver 402 in FIG. 4.

Machine-readable instructions 832 can be stored in volatile memory 814 and/or non-volatile memory 816. Upon execution by the processor circuitry 812, the machine-readable instructions 832 cause the processor platform 800 to perform any or all of the functionality described herein attributed to the system 100 and unit 300.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. An apparatus, comprising:

a first ultrasonic transmitter at a first location;

a first ultrasonic receiver at the first location;

a second ultrasonic transmitter at a second location;

a second ultrasonic receiver at the second location; and one or more controllers in communication with the first ultrasonic transmitter, the first ultrasonic receiver, the second ultrasonic transmitter, and the second ultrasonic receiver and configured to:

at a first time, transmit a first set of ultrasonic pulses using the first ultrasonic transmitter;

at a second time, receive the first set of ultrasonic pulses using the second ultrasonic receiver;

at a third time, transmit a second set of ultrasonic pulses using the second ultrasonic transmitter;

at a fourth time, receive a first echo of multiple echoes of the first set of ultrasonic pulses using the second ultrasonic receiver, in which the third time is the same as the first time or is between the second time and the fourth time;

at a fifth time, receive the second set of ultrasonic pulses using the first ultrasonic receiver; and provide a flow rate measurement between the first and second locations based on the first time, the second time, the third time, and the fifth time.

2. The apparatus of claim 1, wherein the one or more controllers include a single controller.

3. The apparatus of claim 1, wherein the one or more controllers are configured to:

at a sixth time, transmit a third set of ultrasonic pulses using the first ultrasonic transmitter;

at a seventh time, receive the third set of ultrasonic pulses using the second ultrasonic receiver;

at an eighth time, transmit a fourth set of ultrasonic pulses using the second ultrasonic transmitter;

at a ninth time, receive a first echo of multiple echoes of the third set of ultrasonic pulses using the second ultrasonic receiver, in which the eighth time is between the seventh time and the ninth time;

at a tenth time, receive the fourth set of ultrasonic pulses using the first ultrasonic receiver; and provide an update to the flow rate measurement between the first and second locations based on the sixth time, the seventh time, the eighth time, and the tenth time.

4. The apparatus of claim 3, wherein the one or more controllers are configured to:

transmit the first set of ultrasound pulses and the second set of ultrasound pulses are at a first pulse frequency;

transmit the third set of ultrasound pulses and the fourth set of ultrasound pulses are at a second pulse frequency, wherein the first pulse frequency and the second pulse frequency are different.

5. The apparatus of claim 4, wherein the one or more controllers are configured to set the first pulse frequency and the second pulse frequency based on frequency responses of the first ultrasonic transmitter, the first ultrasonic receiver, the second ultrasonic transmitter, and the second ultrasonic receiver, wherein the frequency responses of the first ultrasonic transmitter, the first ultrasonic receiver, the second ultrasonic transmitter, and the second ultrasonic receiver have multiple resonance peaks.

6. The apparatus of claim 3, wherein the one or more controllers are configured to:

transmit the first set of ultrasound pulses and the second set of ultrasound pulses as upchirp pulse signals having a first pulse frequency range;

transmit the third set of ultrasound pulses and the fourth set of ultrasound pulses as downchirp pulse signals having a second pulse frequency range.

7. The apparatus of claim 6, wherein:

the first pulse frequency range and the second pulse frequency range overlap.

8. The apparatus of claim 6, wherein:

the first pulse frequency range and the second pulse frequency range do not overlap.

9. An apparatus, comprising:

a first ultrasonic transmitter;

a first ultrasonic receiver; and a controller coupled to the first ultrasonic transmitter and the first ultrasonic receiver, the controller having a controller input and a measurement output and configured to:

receive a first signal at the controller input, the first signal representing a first time of transmission of a first set of ultrasonic pulses by a second ultrasonic transmitter;

at a second time, receive the first set of ultrasonic pulses using the first ultrasonic receiver;

based on the first time and the second time, determine an expected arrival time of a first echo of multiple echoes of the first set of ultrasonic pulses at the first ultrasonic receiver;

determine a third time of transmission of a second set of ultrasonic pulses, in which the third time precedes the expected arrival time;

at the third time, transmit a second set of ultrasonic pulses using the first ultrasonic transmitter; and provide a second signal representing a flow rate measurement at the measurement output based on the first, second, and third times.

10. The apparatus of claim 9, wherein:

the first ultrasonic transmitter, the first ultrasonic receiver, and the controller are included in a single chip.

11. The apparatus of claim 9, wherein:

the first ultrasonic transmitter and the first ultrasonic receiver are at a first location, and the second ultrasonic transmitter and a second ultrasonic receiver are at a second location.

12. The apparatus of claim 11, wherein the controller is configured to:

receive a third signal at the controller input, the third signal including data representing a distance between the first and second locations and an angle of propagation of the first and second sets of ultrasonic pulses between the first and second locations;

receive a fourth signal at the controller input, the fourth signal representing a fifth time of receiving of the second set of ultrasonic pulses by the second ultrasonic receiver;

determine a first time of flight (TOF) of the first set of ultrasonic pulses propagating from the second location to the first location based on the first time and the second time;

determine a second TOF of the second set of ultrasonic pulses propagating from the first location to the second location based on the third time and the fifth time; and provide a fifth signal representing an update to the flow rate measurement at the measurement output based on the first TOF, the second TOF, and the data.

13. A method, comprising:

at a first time, transmitting a first set of ultrasonic pulses from a first location;

at a second time, receiving the first set of ultrasonic pulses at a second location;

at a third time, transmitting a second set of ultrasonic pulses from the second location;

at a fourth time, receiving a first echo of multiple echoes of the first set of ultrasonic pulses at the second location, in which the third time is the same as the first time, or is between the second time and the fourth time;

at a fifth time, receiving the second set of ultrasonic pulses at the first location; and providing a flow rate measurement between the first and second locations based on the first time, the second time, the third time, and the fifth time.

14. The method of claim 13, further comprising:

at a sixth time, transmitting a third set of ultrasonic pulses from the first location;

at a seventh time, receiving the third set of ultrasonic pulses at the second location;

at an eighth time, transmitting a fourth set of ultrasonic pulses from the second location;

at a ninth time, receiving a first echo of multiple echoes of the third set of ultrasonic pulses at the second location, in which the eighth time is between the seventh time and the ninth time;

at a tenth time, receiving the fourth set of ultrasonic pulses at the first location; and providing an update to the flow rate measurement between the first and second locations based on the sixth time, the seventh time, the eighth time, and the tenth time.

15. The method of claim 14, further comprising:

transmitting the first set of ultrasound pulses and the second set of ultrasound pulses are at a first pulse frequency; and transmitting the third set of ultrasound pulses and the fourth set of ultrasound pulses are at a second pulse frequency, wherein the first pulse frequency and the second pulse frequency are different.

16. The method of claim 15, further comprising:

setting the first pulse frequency and the second pulse frequency based on frequency responses of one or more ultrasonic transmitters and ultrasonic receivers, wherein the frequency responses of the one or more ultrasonic transmitters and ultrasonic receivers have multiple resonance peaks.

17. The method of claim 14, further comprising:

transmitting the first set of ultrasound pulses and the second set of ultrasound pulses as upchirp pulse signals having a first pulse frequency range; and transmitting the third set of ultrasound pulses and the fourth set of ultrasound pulses as downchirp pulse signals having a second pulse frequency range.

18. The method of claim 17, wherein:

the first pulse frequency range and the second pulse frequency range overlap.

19. The method of claim 17, wherein:

the first pulse frequency range and the second pulse frequency range do not overlap.

20. A non-transitory computer readable medium storing instructions that, when executed by processor circuitry, cause the processor circuitry to control a first ultrasonic transmitter and a first ultrasonic receiver at a first location, a second ultrasonic transmitter and a second ultrasonic receiver at a second location to:

at a first time, transmit a first set of ultrasonic pulses from a first location;

at a second time, receive the first set of ultrasonic pulses at a second location;

at a third time, transmit a second set of ultrasonic pulses from the second location;

at a fourth time, receive a first echo of multiple echoes of the first set of ultrasonic pulses at the second location, in which the third time is the same as the first time, or is between the second time and the fourth time;

at a fifth time, receive the second set of ultrasonic pulses at the first location; and provide a flow rate measurement between the first and second locations based on the first time, the second time, the third time, and the fifth time.

* * * * *